United States Patent [19]

Riemrich

[11] Patent Number: 5,244,074
[45] Date of Patent: Sep. 14, 1993

[54] SORTING CONVEYOR ARRANGEMENT

[75] Inventor: Eckhard Riemrich, Gomaringen, Fed. Rep. of Germany

[73] Assignee: Eisenmann Fordertechnik KG', Boblingen, Fed. Rep. of Germany

[21] Appl. No.: 954,659

[22] Filed: Sep. 30, 1992

[30] Foreign Application Priority Data

Oct. 14, 1991 [DE] Fed. Rep. of Germany ....... 4133953

[51] Int. Cl.⁵ .......................................... B65G 47/46
[52] U.S. Cl. .................................... 198/365; 198/802
[58] Field of Search ............ 198/365, 370, 372, 477.1, 198/802

[56] References Cited

U.S. PATENT DOCUMENTS

| | | | |
|---|---|---|---|
| 3,974,909 | 8/1976 | Johnson | 198/365 |
| 4,102,448 | 7/1978 | Wolbrink et al. | 198/365 |
| 4,787,498 | 11/1988 | Males et al. | 198/802 X |
| 4,846,335 | 7/1989 | Hartlepp | 198/365 |
| 4,984,674 | 1/1991 | Fortenberry | 198/365 |
| 5,018,928 | 5/1991 | Hartlepp | 198/365 X |

Primary Examiner—Robert P. Olszewski
Assistant Examiner—James R. Bidwell
Attorney, Agent, or Firm—Cohen, Pontani, Lieberman, Pavane

[57] ABSTRACT

A sorting conveyor arrangement for parcels or the like includes an endless circulating chain on which a plurality of support members for tilting carriages are mounted. Each tilting carriage is tilted in a tilting or emptying station by using switches in which a release roller makes contact with a lifting cam of the switch. The release roller is mounted on a lever which moves a sliding bolt mounted in a tilting head attached to an underside of the tilting carriage. A guide roller is attached to the sliding bolt. When the lever is actuated, the guiding roller is moved into a guide duct of a control cam which causes tilting of the tilting carriage. A guiding piece connected to the sliding bolt engages in an indentation of a locking member attached to the support member, so that the tilting carriage is guided in a positively engaged manner during the entire tilting procedure.

4 Claims, 3 Drawing Sheets

SORTING CONVEYOR ARRANGEMENT

BACKGROUND OF THE INVENTION

1. Field of the Invention

The present invention relates to a sorting conveyor arrangement with a plurality of plates or trays which are arranged usually immediately successively in the conveying direction and are tiltable to both sides about a center axis which extends in the same direction as the conveying direction. The tiltable plates or trays are mounted by means of appropriate support members on an endless circulating chain or the like. The tiltable plates or trays are tilted and returned into the original position by means of appropriate control cams, guide tracks, switches, restoring rollers or similar elements.

2. Description of the Related Art

Various embodiments of the above-described type of conveyor arrangements have been known for a long time. They are used, for example, by postal services for sorting parcels and they are also used in mail order businesses or the like.

However, all previously known systems with forced or positive tilting operation, as disclosed, for example, by European Patent No. 0 173 399, have the disadvantage that the roller guides arranged in separate drums on the respective tilting carriages permit for structural reasons only extremely small lever arms of the control members for the roller guides and, thus, relatively great forces occur on the guide elements and significant wear occurs as a result. This inevitably leads after already a short time to rough running of the entire arrangement and to unstable conditions in the tilting carriages both in the basic positions as well as in the tilted positions. Accordingly, arrangements of this known type are not at all suitable for sorting and conveying parcels of higher weights, i.e. parcels having a maximum weight of, for example, 31.5 kilograms, as required today by some postal services. The known arrangement disclosed by European Patent 0 173 399 has the additional disadvantage that the entire arrangement is very expensive because of the structurally complicated construction and configuration of the control curves and the control elements, particularly when considering the fact that the ratio of tilting carriages to tilting stations usually is approximately 10/1.

SUMMARY OF THE INVENTION

Therefore, it is an object of the present invention to improve the construction and arrangement of the entire control elements of a sorting conveyor arrangement of the above-described type, wherein the arrangement is substantially less susceptible to wear, even at increased weights of the parcels. In addition, the arrangement is to be less structurally complicated and, consequently, operationally safer.

In accordance with the present invention, the above objects are met by a sorting conveyor arrangement of the above-described type which has the following features:

a. a symmetrically constructed tilting head is fixedly arranged at the underside of each of the tilting trays and preferably at an end face thereof; the tilting head is provided with guide rollers which can be extended by means of sliding bolts toward the control cam of each tilting station;

b. a locking member which is also constructed symmetrically and is provided with slide tracks and indentations is mounted adjacent to the tilting head directly on the support member; and c. each of the sliding bolts of the guide rollers which control tilting is at one end thereof connected through a two-arm rocker lever to the release rollers of the guide rollers and has at the other end thereof a sliding piece which rests against the slide tracks of the locking member and is engageable in the indentations of the locking member in a positively engaging manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE PREFERRED EMBODIMENT

The sorting conveyor arrangement according to the present invention include a plurality of tilting carriages arranged in conveying direction F usually immediately one following the other. The tilting carriages are tiltable toward both sides about a center axis M which extends in the same direction as the conveying direction F.

Figure 1:
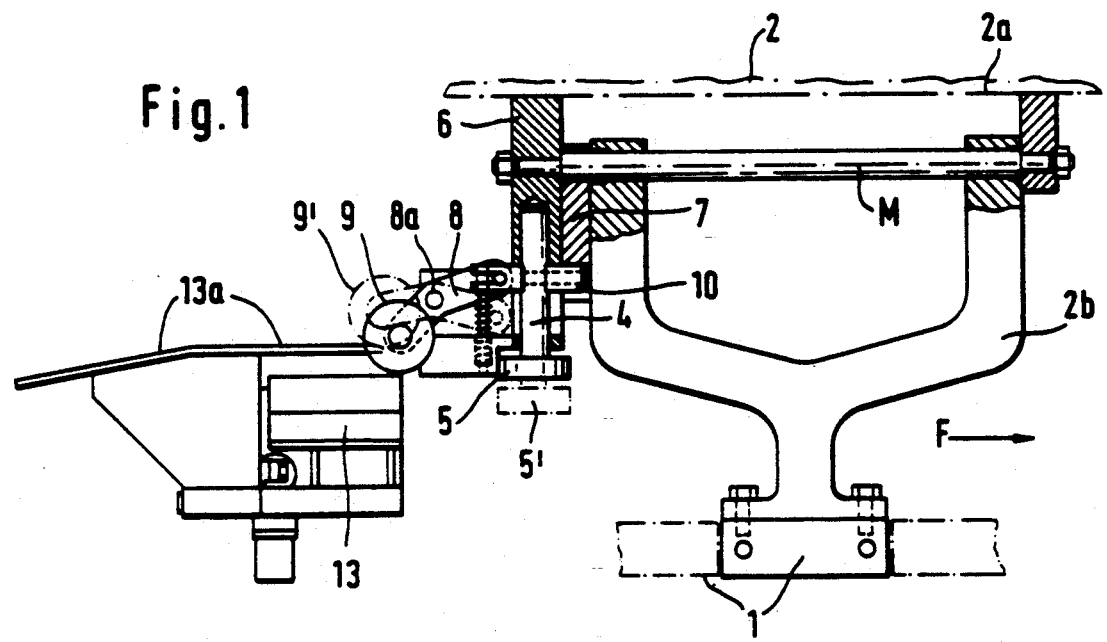
FIG. 1 is an elevational side view of a tilting carriage in accordance with the present invention.

As illustrated in FIG. 1 of the drawing, each tilting carriage includes a plate or tray 2 which is mounted with an underside 2a thereof on support members 2b which, in turn, are fastened on an endless circulating chain 1. Control cams 3 with guide tracks 3a, switches 13,13a and guide rollers 5 as well as release and restoring rollers 9 are used for the positively controlled tilting of the tilting carriages and for returning the carriages into the original position.

The following three features are of particular significance in the sorting conveyor arrangement according to the present invention:

(a) a symmetrically constructed tilting head 6 is fixedly mounted on the underside 2a of each tilting tray 2; the tilting head 6 is preferable arranged at the rearward end face of the tilting tray 2 as seen in conveying direction F; the tilting head 6 is provided with guide rollers 5 which are extendable by means of sliding bolts 4 toward the respective control cam 3,3a of the tilting stations or switches 13,13a;

(b) a locking member 7 is mounted directly on the support member 2b of the tray 2 adjacent the tilting head 6; the locking member 7 is also symmetrically constructed and is provided with slide tracks 7a and indentations 7b; and (c) the sliding bolts 4, which cause tilting because of forced guidance on both sides in the respective guide duct 3a of the control cam 3, are connected, on the one hand, to a release roller 9 through a two-arm rocker lever 8 and, on the other hand, have a sliding piece 10 which rests during tilting always against the slide tracks 7a of the locking member 7 and are received in a positively engaging manner in each tilted position in the corresponding indentation 7b.

Accordingly, if the switch 13 is switched appropriately, one of the release rollers 9 travels onto the contact or lifting track 13a of the switch 13 and the two-arm lever 8 moves the sliding bolt 4 together with the guide roller 5 downwardly into the duct 3a of the control cam 3, so that the sliding piece 10 which is also mounted on the sliding bolt 4 is moved along one of the tracks 7a into the locked or end position in the respective indentation 7b.

Since the construction according to the present invention permits relatively large lever arms and guide rollers 5 as compared to the state of the art, the guide elements are subjected to only small forces and, consequently, practically no wear occurs. This means that the arrangement according to the present invention travels very quietly. In addition, in the basic position as well as in any tilted position of the trays 2, the sliding pieces 10 which are engaged and secured toward both sides always ensure positively engaged and stable conditions of the moveable element.

In accordance with another advantageous feature of the present invention, the sliding bolts 4 of each tilting head 6 extend inclined relative to the vertical in accordance with the desired tilting angle a of the trays 2. The sliding bolts 4 are guided in bores 6a or ducts of the tilting head 6 and are connected through a slot-type connection 4a to a connecting member 8a of the two-arm rocker lever 8. The fulcrum 8a of the rocker lever 8 is located in a bearing member 11 which is separately mounted on the tilting head 6. The rocker lever 8 is held in its initial position together with the sliding bolt 4 by means of a spring 12.

The spring 12 is a compression spring, so that, even if the spring should break, it is always ensured that after each tilting procedure has been concluded, the release roller 9 is again retracted by means of the lever 8 including the sliding bolt 4. Accordingly, it is ensured that these components can never be damaged or even torn off by switches 13,13a which are switched incorrectly.

Figure 2:
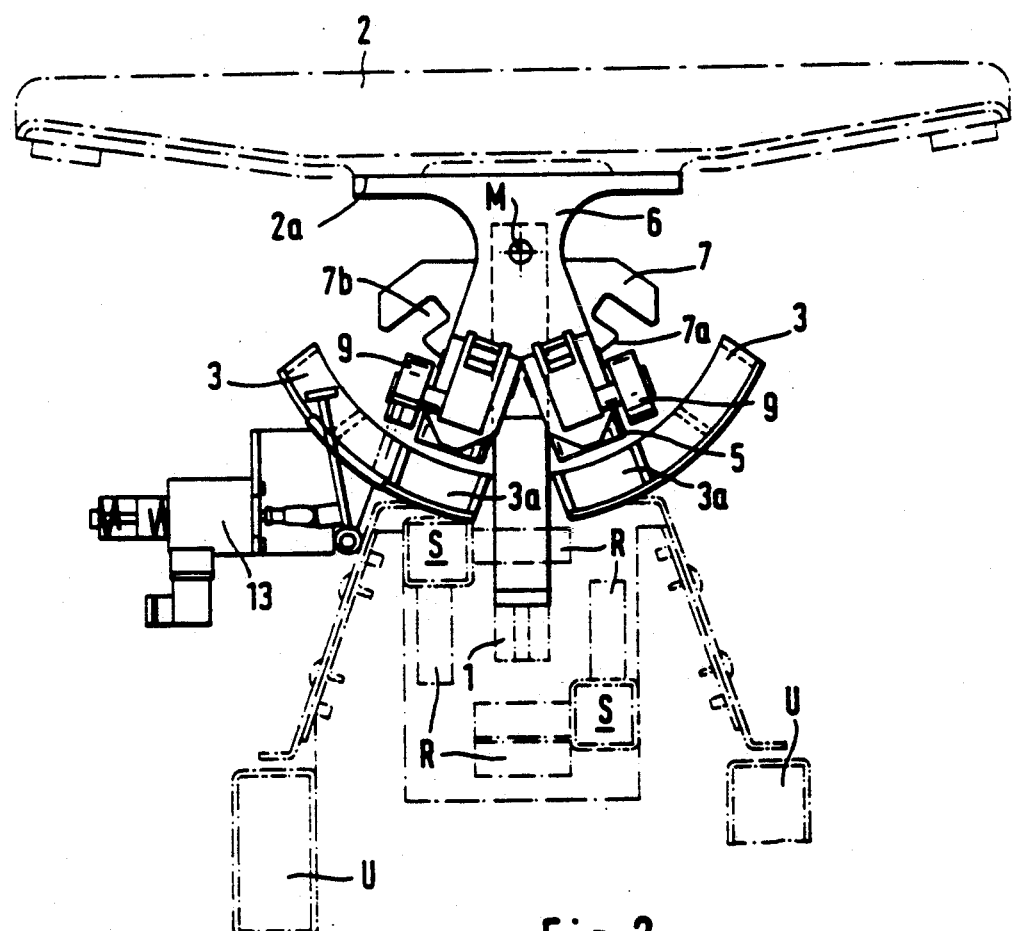
FIG. 2 is a front view of the tilting carriage shown in FIG. 1 seen in conveying direction.
Figure 3:
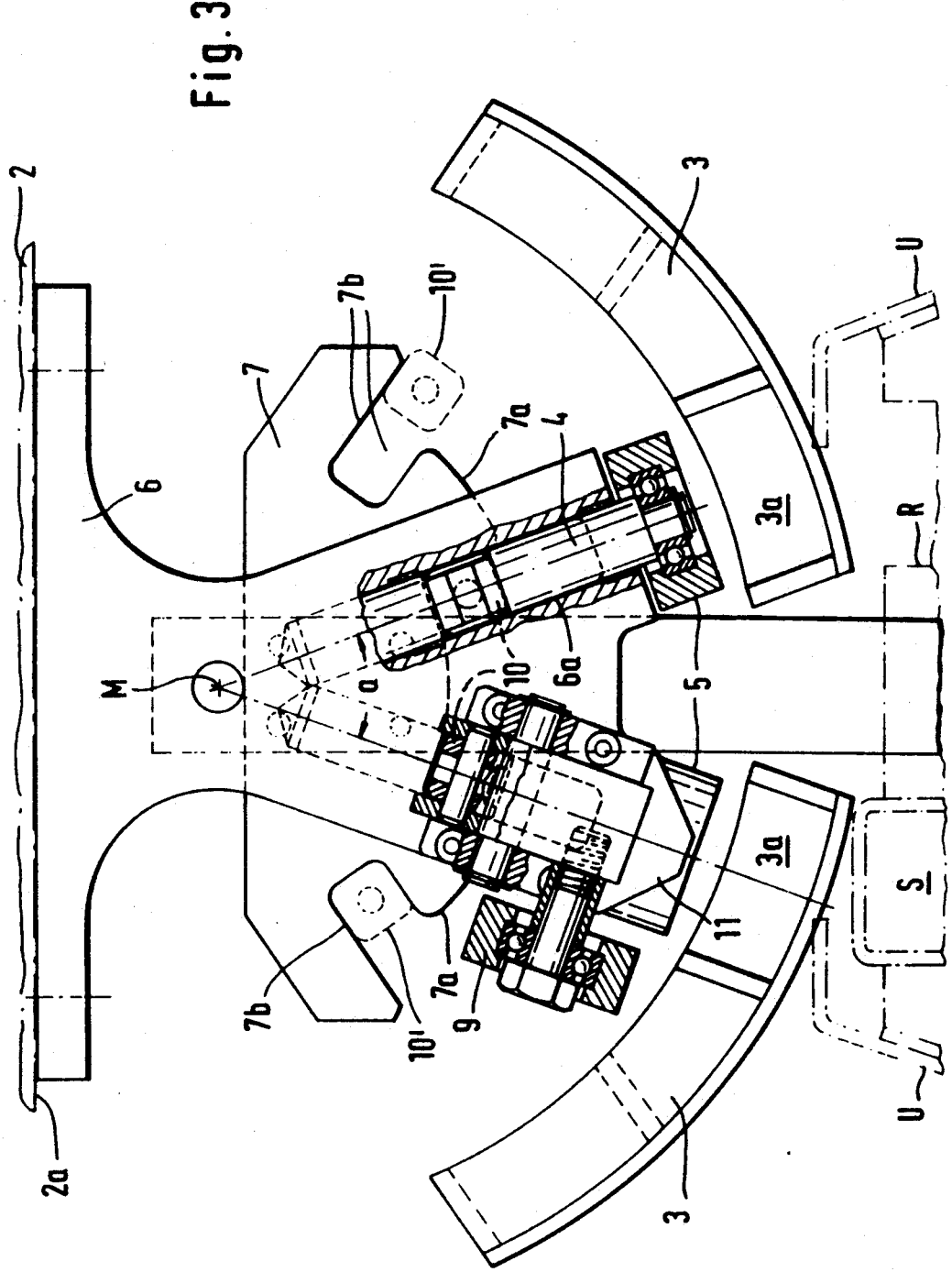
FIG. 3 is a front view, on a larger scale, showing a detail of the tilting carriage.
Figure 4:
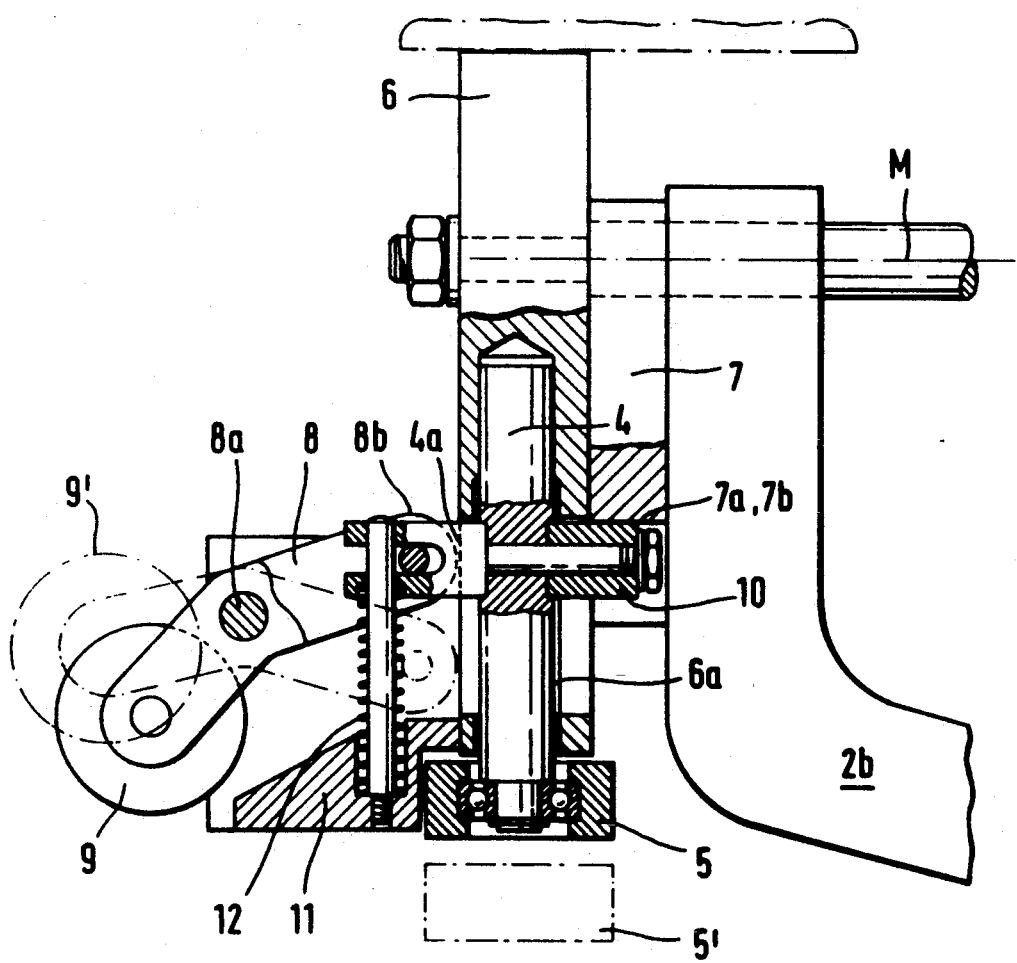
FIG. 4 is a side view, also on a larger scale, showing the tilting head arrangement of the tilting carriage of FIG. 1.

FIG. 2 of the drawing additionally shows chain guide rollers R and guide rails S therefor. Also shown is a support structure U.

Finally, the above-described sorting conveyor arrangement according to the present invention provides the following additional advantages:

the tilting carriages can be tilted in a positively engaged manner from the horizontal position toward both sides up to a maximum tilting angle of 35°;

the tilting behavior can be optimized by appropriately constructing the guide or control cams 3,3a so that, for example, tilting of the conveyed parcels cannot occur;

oppositely located guide or control cams or tilting stations only require a minimum offset distance of 400 millimeters;

all tilting carriages are of simple construction and provided with low-wear sliding bearings; and all occurring forces are reduced by selecting large lever arms; this results in low wear and always very quiet running of all moveable parts.

It should be understood that the preferred embodiments and examples described are for illustrative purposes only and are not to be construed as limiting the scope of the present invention which is properly delineated only in the appended claims.

What is claimed is:

1. A sorting conveyor arrangement comprising a plurality of tilting carriages with tilting trays arranged one following the other in a conveying direction, the tilting carriages being tiltable about a center axis extending in the same direction as the conveying direction, the tilting carriages being mounted by means of support members on an endless circulating chain, further comprising tilting stations with control elements for a positively guided tilting of the tilting carriages and for restoring the tilting carriages into an upright position, the sorting conveyor arrangement further comprising a symmetrically constructed tilting head fixedly mounted on an underside of each tilting carriage, each tilting head having guide rollers extendable by means of sliding bolts toward the control elements of each tilting station;

a locking member being mounted directly on the support member adjacent the tilting head, the locking member being constructed symmetrically and having slide tracks and indentations; and each sliding bolt for the guide rollers which control tilting having first and second sides, the first side of the sliding bolt being connected to a two-arm rocker lever on which release rollers are mounted, and the second side of the sliding bolt having a sliding piece which rests against the slide tracks of the locking member and can be received in a positively engaging manner by the indentations of the locking member.

2. The sorting conveyor arrangement according to claim 1, wherein the tilting head is mounted on a rearward end face of the tilting carriage in conveying direction.

3. The sorting conveyor arrangement according to claim 1, wherein the sliding bolts of each tilting head extend inclined relative to the vertical corresponding to a desired tilting angle of the tilting carriages, the sliding bolts being guided in bores of the tilting head and being connected through a slot-type connection to a connecting member of the two-arm rocker lever.

4. The sorting conveyor arrangement according to claim 3, further comprising a bearing member mounted on the tilting head, the two-arm rocker lever having a fulcrum, the fulcrum being mounted on the bearing member, further comprising a spring for biasing the two-arm rocker lever including sliding bolt into an initial position.

* * * * *